United States Patent
Ton et al.

(10) Patent No.: US 9,302,725 B2
(45) Date of Patent: Apr. 5, 2016

(54) LOCKING RACK SYSTEM FOR BICYCLES

(71) Applicant: Bell Sports, Inc., Scotts Valley, CA (US)

(72) Inventors: Tony M. Ton, San Jose, CA (US); Robin Samson, Santa Cruz, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 296 days.

(21) Appl. No.: 13/831,078

(22) Filed: Mar. 14, 2013

(65) Prior Publication Data

US 2014/0263510 A1    Sep. 18, 2014

(51) Int. Cl.
*B62J 9/00* (2006.01)
*B62J 7/04* (2006.01)
*B62H 5/00* (2006.01)

(52) U.S. Cl.
CPC . *B62J 7/04* (2013.01); *B62H 5/001* (2013.01); *B62J 9/001* (2013.01)

(58) Field of Classification Search
CPC .............. B62J 7/04; B62J 9/001; B62H 5/001
USPC ......... 224/422, 423, 427, 430, 431, 435, 440, 224/443, 447, 449, 450, 452, 453, 454
See application file for complete search history.

(56) References Cited

U.S. PATENT DOCUMENTS

| | | | | | |
|---|---|---|---|---|---|
| 4,966,382 | A | * | 10/1990 | Giles | 280/288.4 |
| 5,435,471 | A | * | 7/1995 | Chuang | 224/419 |
| 5,579,971 | A | * | 12/1996 | Chuang | 224/430 |
| 5,836,491 | A | * | 11/1998 | Chuang | 224/456 |
| 6,095,473 | A | * | 8/2000 | Engers | 248/339 |
| 7,273,221 | B2 | | 9/2007 | Ockenden | |
| 8,453,895 | B2 | * | 6/2013 | Vitanza | 224/454 |
| 2004/0211804 | A1 | * | 10/2004 | Lee | 224/427 |
| 2006/0138185 | A1 | * | 6/2006 | Lien et al. | 224/427 |
| 2006/0186159 | A1 | * | 8/2006 | Lawrence | 224/422 |
| 2009/0159626 | A1 | * | 6/2009 | Hoidal et al. | 224/416 |

* cited by examiner

*Primary Examiner* — Corey Skurdal
(74) *Attorney, Agent, or Firm* — Booth Udall Fuller, PLC (57) ABSTRACT

A locking rack solves the problem of not being able to securely carry and store items on a bicycle. The system allows for a luggage rack, rack-top bag, and panniers to all be locked together through the use of mounting clips, security rails, and security hooks, a traditional security cable, and a single lock integrated into the rack. The bags, panniers, and luggage racks according to the invention may be attached to the front and/or rear of a bicycle and may be used with any other bags, panniers, or luggage racks; however, the security advantages of the present invention may only be realized fully by using the complete system of the present invention described including bags, panniers, and luggage racks.

20 Claims, 10 Drawing Sheets

LOCKING RACK SYSTEM FOR BICYCLES

FIELD OF THE INVENTION

The present invention generally relates to the field of package and article carriers. In particular, the present invention is directed to a locking rack system for bicycles.

BACKGROUND

Due at least in part to economic, environmental, and fitness advantages, many people are turning to bicycles in order to meet their daily transportation needs. However, most people still rely on expensive and less environmentally friendly automobiles in situations where they want or need to carry and store items that may be stolen or subject to unwanted public attention. For example, if someone rides their bicycle to a video store, rents a few videos, and then rides to the grocery store to pick up some fruit, they may not want to or be permitted to bring the video rentals into the grocery store with them. Since leaving the rentals with their bicycle could result in the videos being stolen, and since automobiles provide a far more reasonable expectation of security and privacy, this can lead to people choosing to use their automobiles when they might otherwise use their bicycles.

In spite of this, many people still choose to use their bicycles in situations where they want or need to carry and store items that may be stolen or subject to unwanted public attention. This manifests itself in the makeshift locking of bags, helmets and other items to luggage racks (or "cargo racks") and/or to bicycles themselves that can often be observed on municipal bicycle racks in most urban settings.

SUMMARY OF THE DISCLOSURE

Embodiments of the present invention variously address the problem of not being able to securely carry and store items on a bicycle. In an exemplary embodiment of the invention, luggage racks with integrated lock and hinged lid components are presented. Rack-top and side bags according to the invention may be locked to the luggage rack in various combinations. In some embodiments, mounting clips and associated security rails according to the invention allow for a secure interface between panniers and luggage racks of the present invention. Security hooks according to embodiments of the invention allow cyclists to use a traditional security cable in combination with the integrated lock of the luggage rack of the present invention to lock their bicycle to a fixed object such as a tree or municipal bicycle rack. As such, a single lock may be used to lock a bicycle to a fixed object, a rack-top bag and any panniers to a luggage rack on the bicycle. The bags, panniers, and luggage racks according to the invention may be attached to the front and/or rear of a bicycle and may be used with any other bags, panniers, or luggage racks; however, the security advantages of the present invention may only be realized fully by using the complete system of the present invention described herein comprising bags, panniers, and luggage racks.

In one implementation, the present disclosure is directed to a lockable bicycle rack system. The system includes at least one rack, comprising a fixed component adapted to be secured to a bicycle frame, a lid pivotably attached to the fixed component movable between a first open position and a second closed position, the fixed component and lid defining a fixed locking space therebetween in the closed position; and a locking mechanism integrated into at least one of the fixed component and the lid for locking the lid in the second closed position; and at least one attachment member configured for mounting accessory components to the at least one rack, the attachment member being configured and dimensioned to be captured in the fixed locking space when the lid is locked in the second closed position.

In another implementation, the present disclosure is directed to a bicycle rack adapted for use in a locking rack system including containers lockable to the rack. The bicycle rack includes a fixed rack component configured and dimensioned to be mounted on a bicycle frame, a hinged lid pivotably mounted on the fixed component; a locking mechanism integrated into at least one of the fixed component and the lid for locking the lid to the fixed component; and side members associated with the fixed rack and the hinged lid configured and dimensioned so as to be spaced apart by a predetermined distance to capture an attachment member therebetween.

In still another implementation, the present disclosure is directed to an accessory mounting clip for use with a bicycle rack. The clip includes a base component adapted to be secured to a bicycle accessory to be mounted on the bicycle rack; a support member extending outwardly from the base component; a first, upwardly directed gap formed at least partially by an outer end of the support member, the first gap being configured and dimensioned to receive a first bicycle rack member; a second, downwardly directed gap formed at least partially by an inner end of the support member adjacent the base member, the second gap configured and dimensioned to receive a second rack member with a portion of the support member positioned between the rack members; and a moveable lock member with a first end configured to at least partially enclose the second rack member when received in the second gap, the lock member being positioned adjacent the first gap such that movement of the lock member is blocked by the first rack member when received in the first gap.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Embodiments of the present invention overcome the disadvantages of not being able to securely carry and store items on a bicycle by providing a locking luggage rack system. In an exemplary embodiment, the system comprises luggage racks with integrated locks and spring-biased hinged components, rack-top bags, mounting clips and associated security rails, and security hooks.

Figure 1:
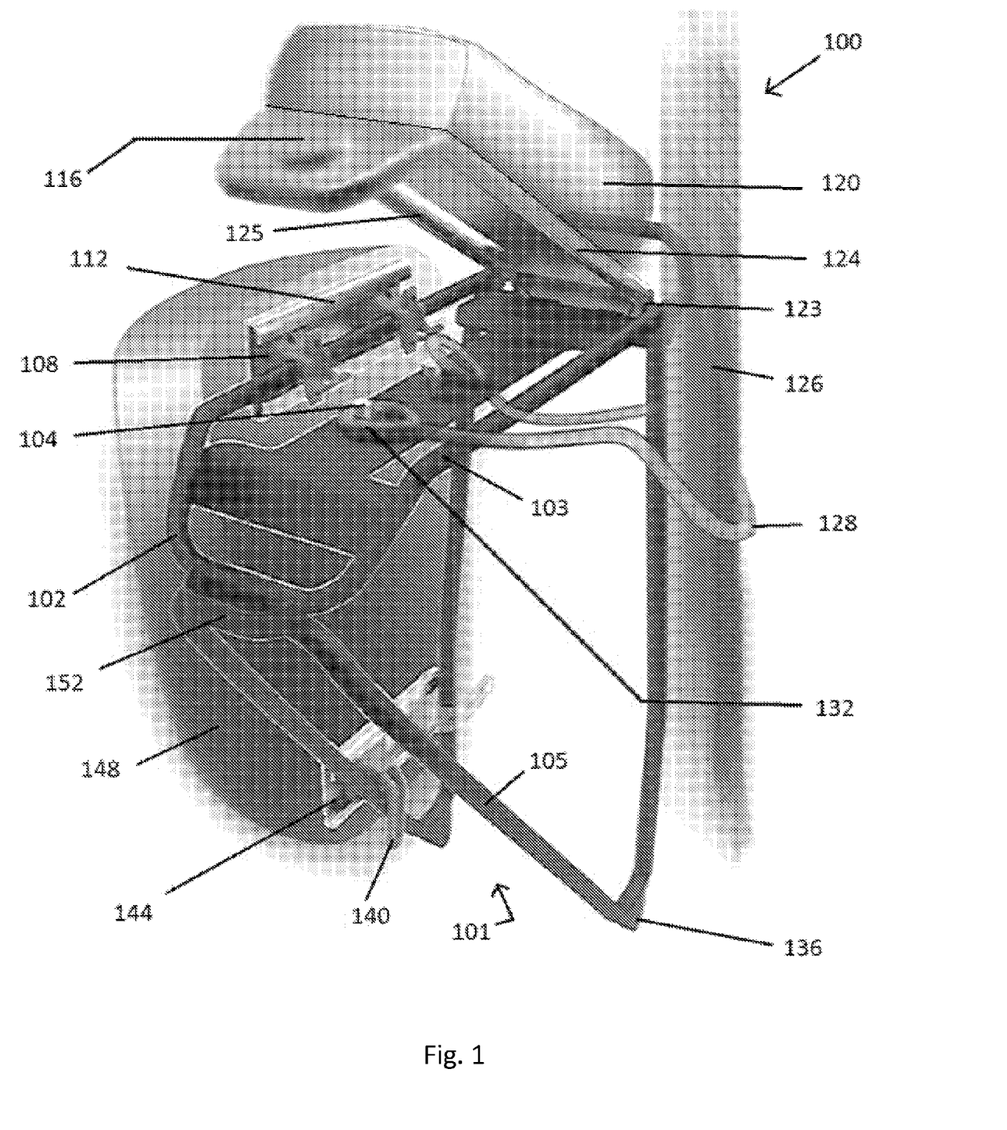
FIG. 1 is a perspective view of a luggage rack system according to an exemplary embodiment of the invention with an integrated lock and a bag, security hooks, and pannier with a security rail and mounting clips attached.

FIG. 1 shows an exemplary luggage rack system 100 comprising a rack 101 and lockable bags 120, 148. Rack 101 includes a fixed component or rack body 102 and a hinged lid 124 attached to the rack body by pivot or hinge 123. Rack body 102 includes side members 103 and struts 105, and lid 124 includes side members 125. The side members of each cooperate to form a fixed locking space 228 (see FIG. 2C) between the members when the lid is closed and thus capture mounting clips there between as described below to securely lock bags carried by the rack system on the bicycle. In the embodiment shown, lid 124 also includes an integrated lock 116. Features of system 100 as described in more detail below include rack-top bag 120, security hooks 104, and a pannier 148 with security rails 112, 144, mounting clips 108, and mounting hooks 140 attached thereto.

Rack 101 of the luggage rack system 100 may be attached to a bicycle at an attachment point 136 or in any other suitable way. A reflector or light bracket 152 may be attached to the back of the luggage rack 101. The pannier 148 has security rails 112, 144 permanently affixed to a surface thereon. The mounting clips 108 and mounting hooks 140 are slidably adjustable within the security rails 112, 144 until screws (not shown) passing through the mounting clips 108 and mounting hooks 140 are tightened. This slidable adjustability provides a "universal fit" in that it allows the pannier 148 to be attached to nearly any size or shape of luggage rack. Once installed on the luggage rack 101, the pannier 148 may be locked to the rack 101 by simply closing the lid 124 of the rack 101 and locking the lock 116 integrated with the rack 101. The lid 124 of the rack 101, upon being closed and locked, engages the mounting clips 108 such that the mounting clips 108, and thus the pannier 148, cannot be removed from the rack 101. Additionally, as described in more detail below in connection with FIGS. 4A-D, side members 125 of lid 124, in cooperation with side members 103 of rack body, prevent access to screws securing mounting clips 108 to security rails 112.

In an exemplary embodiment of the present invention, a security cable 128 may be wrapped around a fixed object 126 (such as a tree, lamp post, or municipal bicycle rack) and attached at its ends 132 to security hooks 104 built into the luggage rack 101. The lid 124 of the rack 101, upon being closed and locked, abuts or nearly abuts the security hooks 104 such that the security cable 128 cannot be removed from the security hooks 104.

Figure 2A:
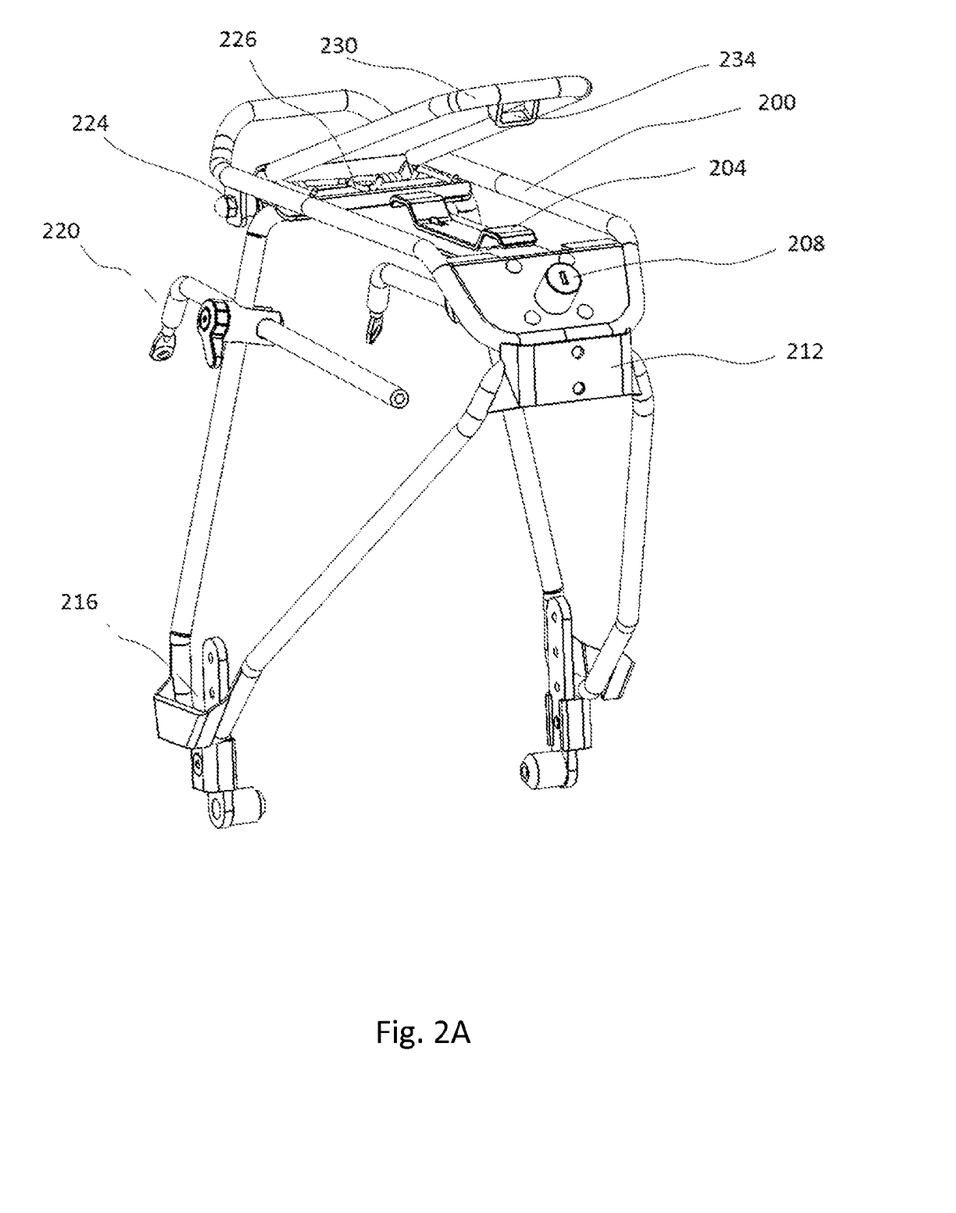
FIG. 2A is a perspective view of a luggage rack in an unlocked, open position with integrated lock and security hooks according to an embodiment of the present invention.

FIG. 2A shows a luggage rack 200 with an integrated lock 208 and security hooks 204 according to an alternative embodiment of the present invention. The luggage rack 200 may be attached to a bicycle with universal fit attachments 216, 220 as is known in the art or in any other suitable way. A reflector (or tail-light or headlight) bracket 212 may be attached to the back of the luggage rack 200. The lid 230 of the rack 200 is rotatable about pivot 224 and may include a latch component 234 that interfaces with the integrated lock 208 in order to lock the rack 200 in a closed position. In an exemplary embodiment, a spring 226 may be provided in communication with the lid 230 such that the lid is spring-biased to close; however, in alternative embodiments, the lid 230 may be spring-biased to open.

Figure 2B:
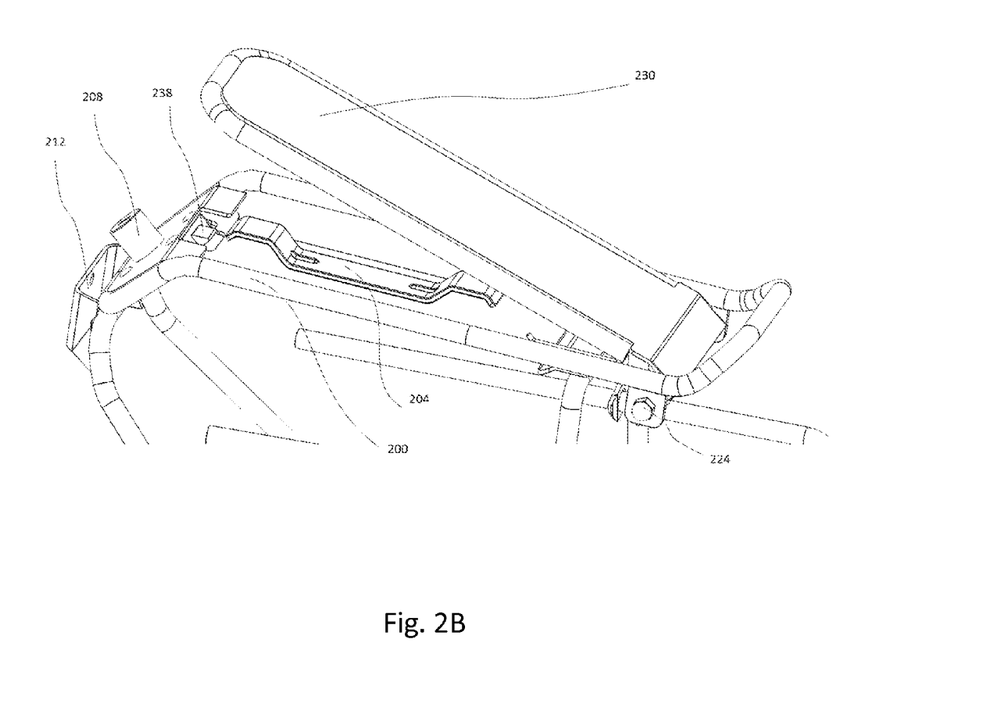
FIG. 2B is a detail view of locking components of the luggage rack shown in FIG. 2A.

FIG. 2B shows a detail view of the luggage rack 200 shown in FIG. 2A including the lid 230, the pivot 224 about which the lid rotates, the security hooks 204, the integrated lock 208, and the reflector (or tail-light or headlight) bracket 212. A latching component 238 of the integrated lock 208 is additionally shown. The latching component 238 of the integrated lock 208 interfaces with the latch component 234 (shown in FIG. 2A) attached to the lid 230 in order to lock the lid 230 to the rack 200 in a closed position.

Figure 2C:
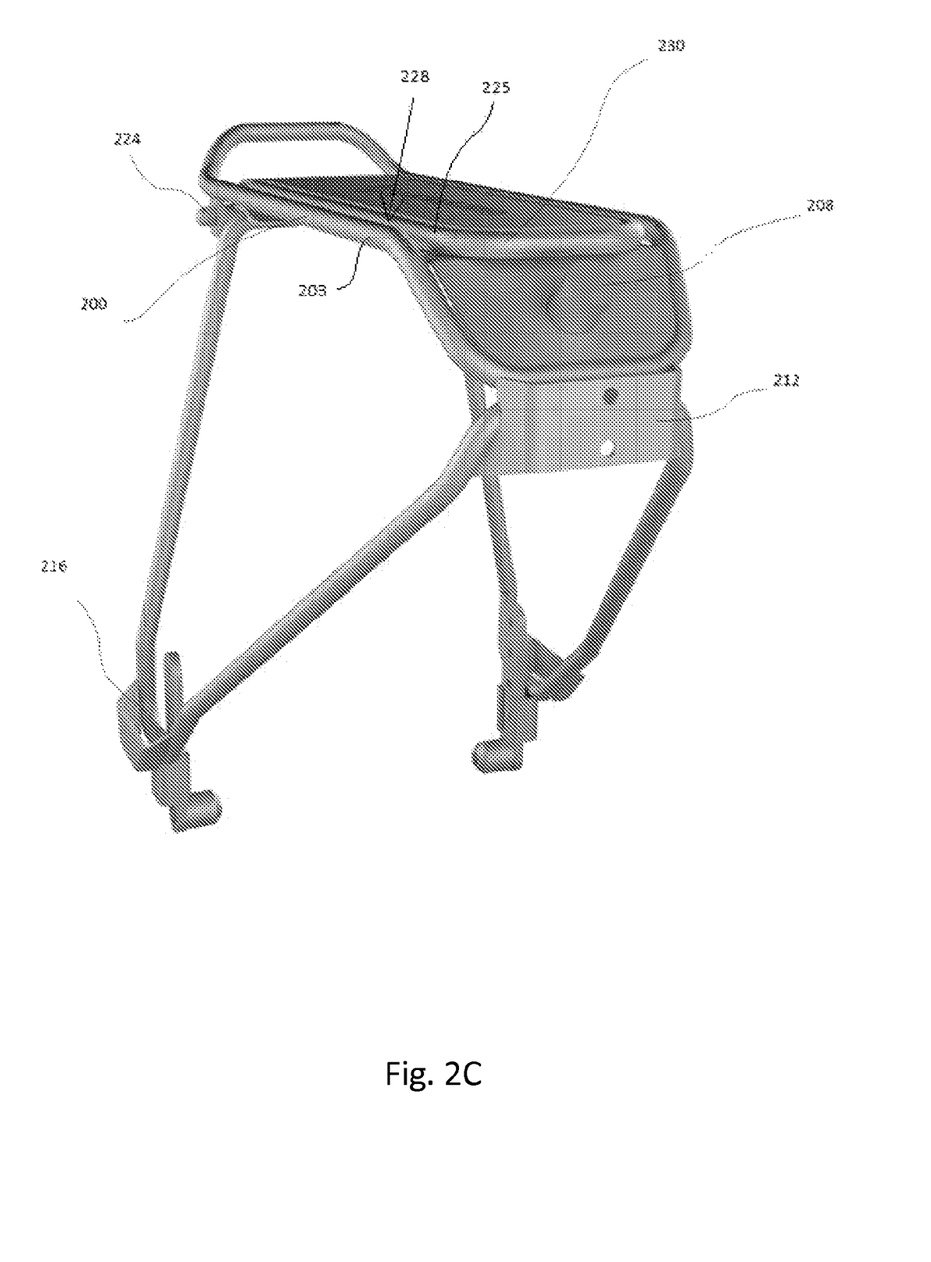
FIG. 2C is a perspective view of a luggage rack with an integrated lock in a closed, locked position according to another exemplary embodiment of the present invention.

FIG. 2C shows a rear perspective view of the luggage rack 200 shown in FIG. 2A, including the lid 230, the pivot 224 the lid rotates about, the integrated lock 208, the reflector bracket 212, and universal fit attachments 216. In this view, the lid 230 is closed and fixed locking space 228 can be seen as formed by the spacing of rack body side member 203 and lid side member 225 in the closed and locked position. The lid may be locked by locking the integrated lock 208.

Figure 3A:
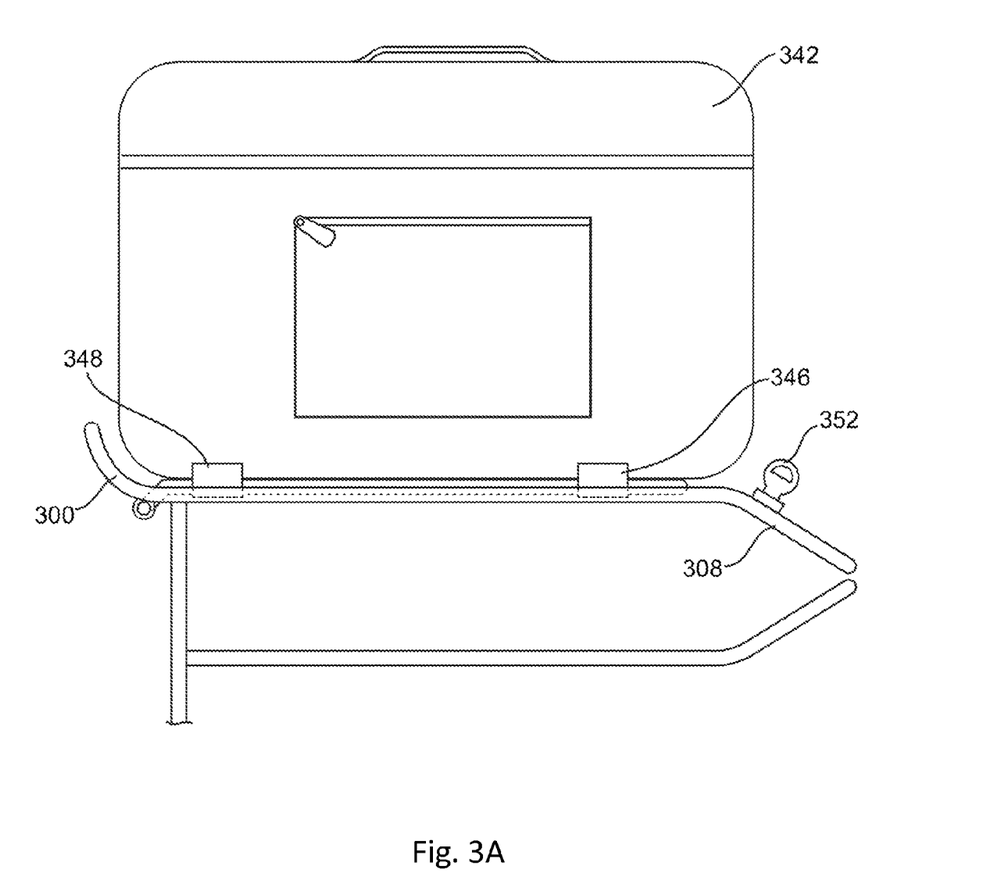
FIG. 3A is a side view of a rack-top bag installed on a luggage rack according to an embodiment of the present invention.

FIG. 3A shows a rack-top bag 342 installed on a luggage rack 300 according to an alternative embodiment of the present invention. The rack-top bag 342 comprises straps 346, 348 attachable to the rack lid (see, for example, lid 330 in FIG. 3B) in order to secure the bag 342 to the rack 300. Also visible are the integrated lock 308 and a key 352 for operating the lock 308.

Figure 3B:
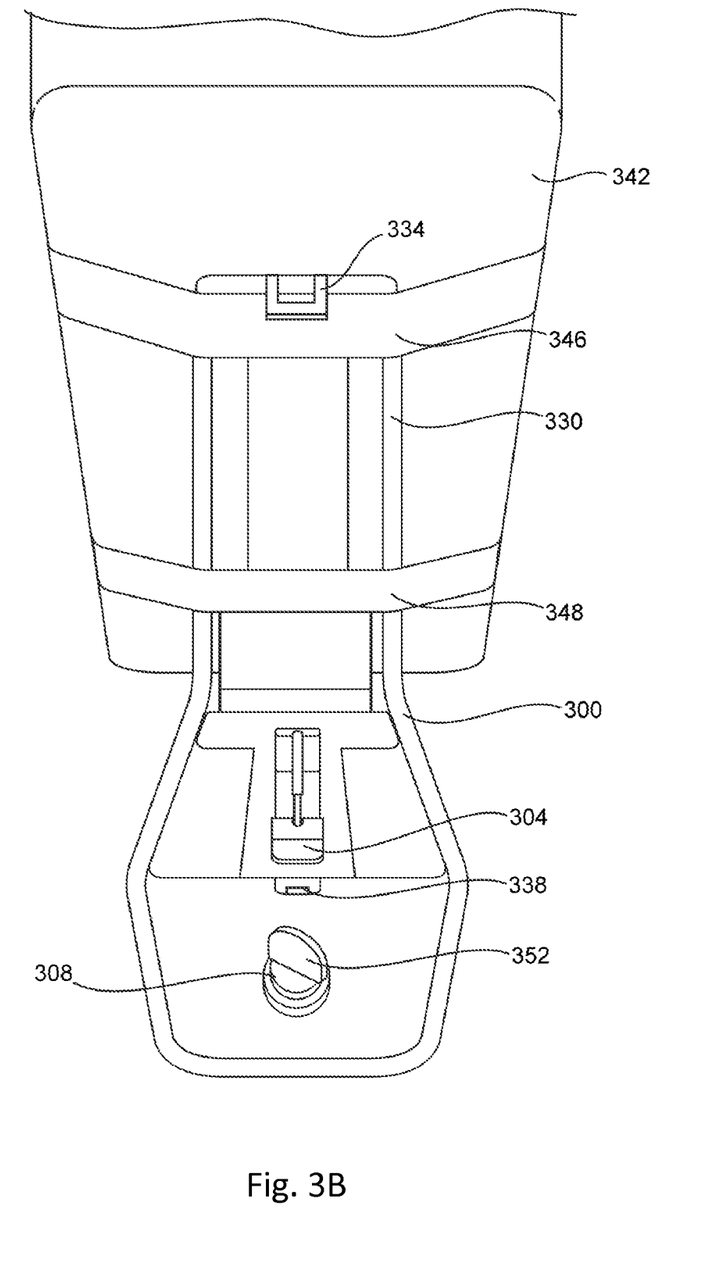
FIG. 3B is a detail view of the rack-top bag and luggage rack shown in FIG. 3A with the rack in an open position.

FIG. 3B shows a detail view of the rack-top bag 342 and luggage rack 300 shown in FIG. 3A with the rack lid 330 in an open position. The latch component 334 and latching component 338 are visible, as are the security hooks 304, the key 352, the integrated lock 308, and the lid 330. As shown, the rack-top bag 342 is secured to the lid 330 by attaching the straps 346, 348 to the lid 330 behind the latch component 334. In such an arrangement, upon the lid 330 of the rack 300 being closed and locked, the straps 346, 348 are secured and locked to the lid 330 and thus to the luggage rack 300. Attachment means other than straps 346 may be employed, such as connection by bolt-like members through the center plate of lid 330 or other clips, buckles, etc. wherein access to the attachment means is restricted when the lid is closed and locked.

Figure 4A:
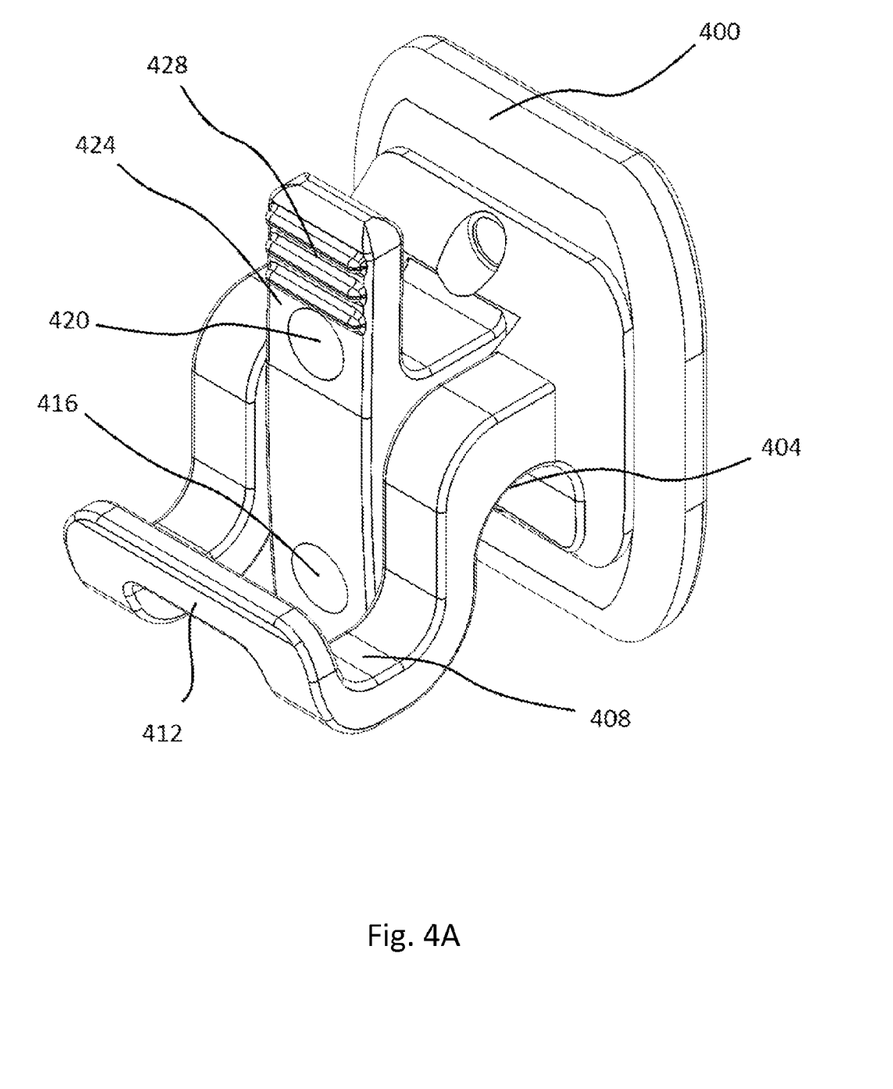
FIG. 4A is a perspective view of a security clip according to an embodiment of the present invention.
Figure 4B:
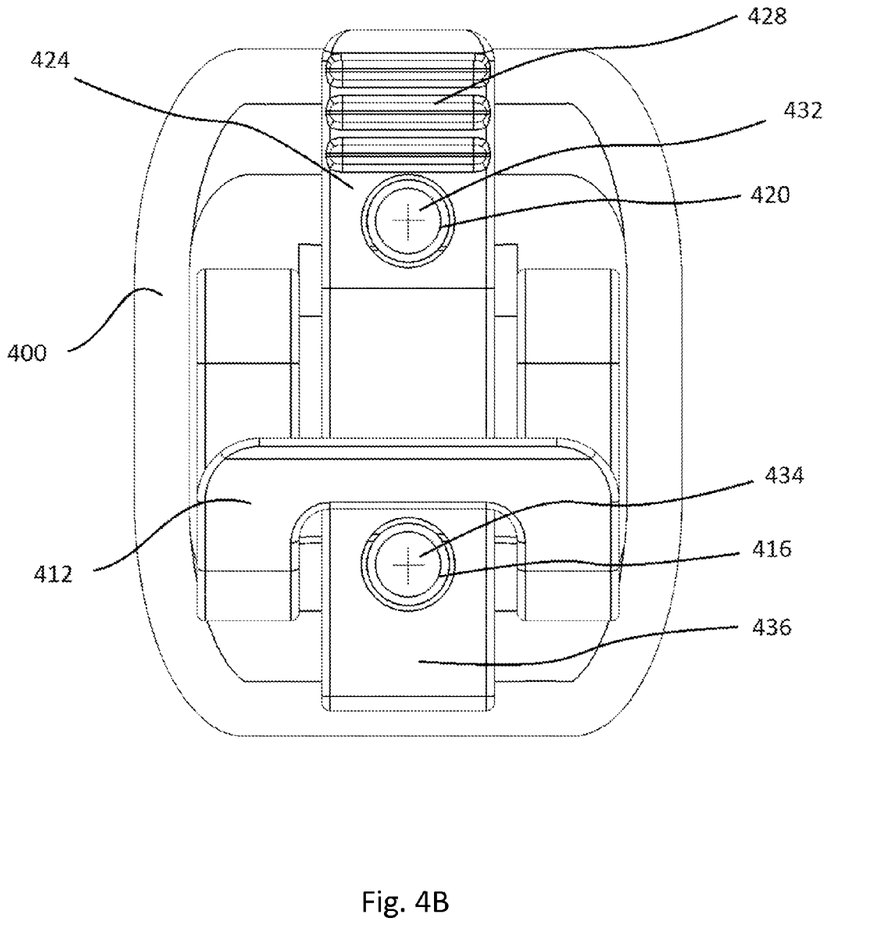
FIG. 4B is a front view of a security clip according to an embodiment of the present invention.

FIGS. 4A-D show an accessory mounting clip 400 according to an exemplary embodiment of the present invention. Clips 400 form attachment members for attaching various accessory components, such as panniers or baskets to the rack. FIG. 4A shows a perspective view of the mounting clip 400 including a grip 428, a grip post 424, through-holes 416, 420, an extending component 412, a lid-receiving gap 408, and a rack-receiving gap 404. FIG. 4B shows a front view of the mounting clip 400 including the grip 428, the grip post 424, the through-holes 416, 420, the through-hole axes 432, 434, the extending component 412, and the rack latch 436. The positions of rack members as received in the gaps when the clip is mounted on a rack are indicated by the dashed circles in FIG. 4C.

Figure 4C:
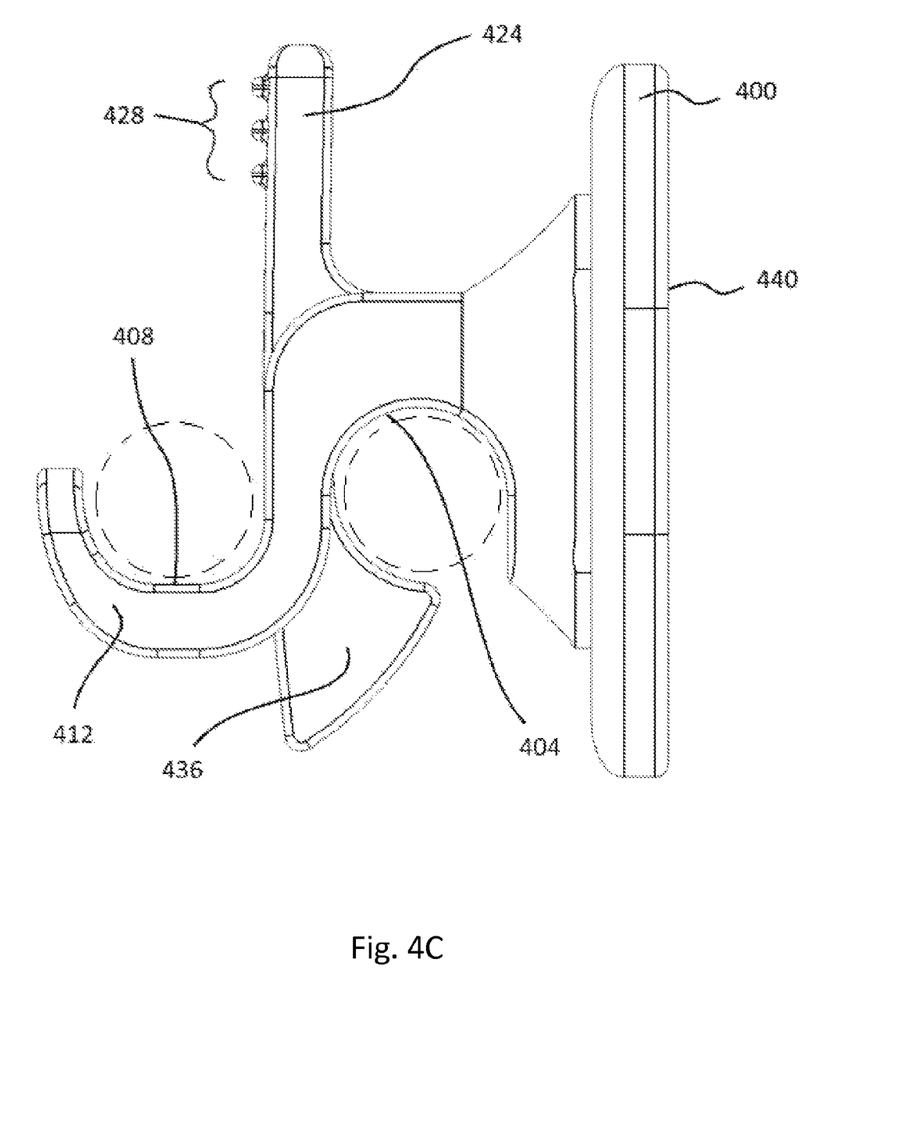
FIG. 4C is a side view of a security clip according to an embodiment of the present invention.
Figure 4D:
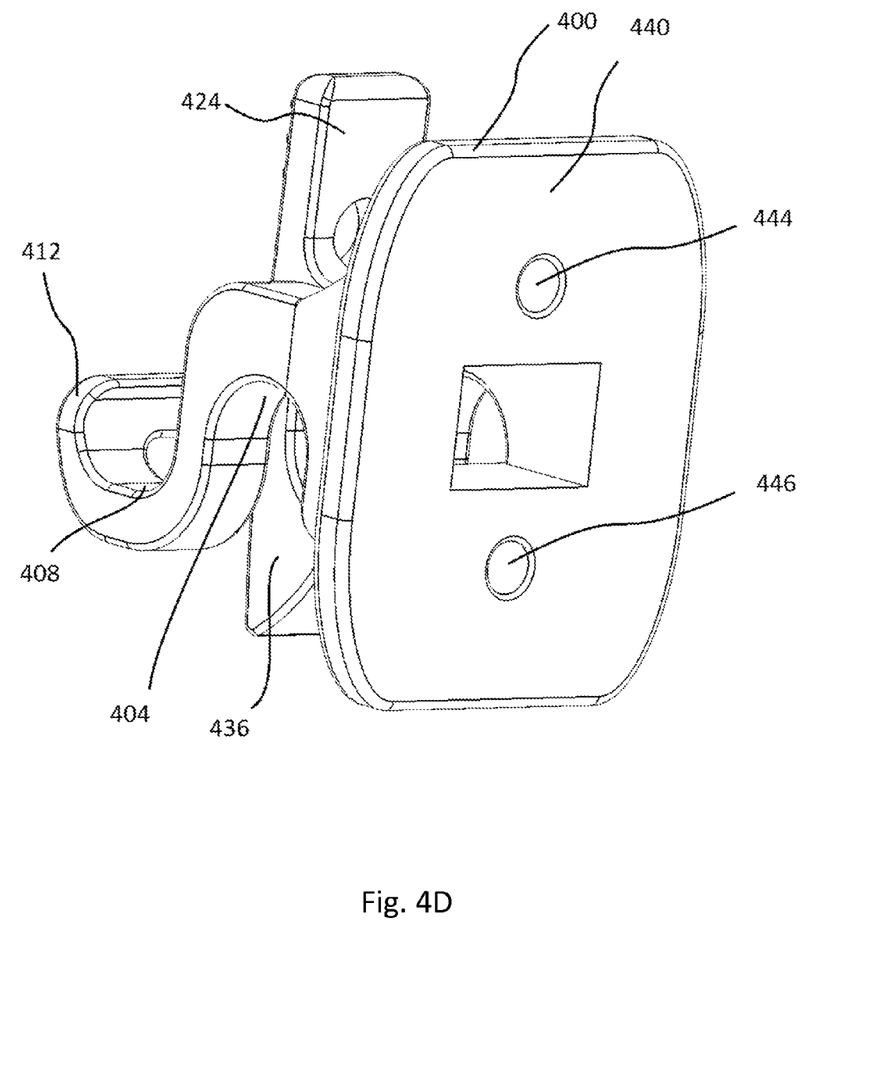
FIG. 4D is a rear perspective view of a security clip according to an embodiment of the present invention.

FIG. 4C shows a side view of the mounting clip 400 including the grip 428, the grip post 424, the extending component 412, the lid-receiving gap 408, the rack-receiving gap 404, the rack latch 436, and a back surface 440. FIG. 4D shows a rear view of the mounting clip 400 including the grip post 424, the extending component 412, the lid-receiving gap 408, the rack-receiving gap 404, the rack latch 436, the back surface 440, and through-holes 444, 446. As described above and can be seen in FIG. 1, mounting clip 400, upon being inserted into a security rail 112, is limited to a single degree of freedom (i.e., sliding back and forth along the rail 112) by portions of the security rail 112 that retain top and bottom portions of the mounting clip 400.

To install a mounting clip 400 on a luggage rack, such as is shown in FIG. 1 or 2, force may be exerted on the grip 428 of the grip post 424 in order to cause the rack latch 436 to move in the opposite direction (since the grip post 424 and the rack latch 436 form a lever). This widens the rack-receiving gap 404 so that the mounting clip 400 may be attached to the rack by inserting a portion of the rack into the rack-receiving gap 404. The mounting clip 400 may also simply be forcibly pressed onto a portion of the rack in order to force a portion of the rack into the rack-receiving gap; however, it should be noted that this may result in scratching or otherwise damaging the rack.

To lock a mounting clip 400 in place, screws (not shown) are fitted through the through-holes 416, 420 along the axes 432, 434, and through the back surface 440 of the mounting clip 400 via through-holes 444, 446, at which point they begin to contact and press against the security rail. Tightening the screws presses the top and bottom portions of the mounting clip 400 against the retaining portions of the security rail 112 and prevents the mounting clip 400 from being slid along the security rail 112. When the lid 230, 330 is closed and locked on the rack, the side members of the rack and rack lid prevent access to the screws and thereby help to ensure the security of bags locked to the rack system 100 using clips 400.

Once mounting clips 108 are installed on a rack and locked in place, such as can be seen in FIG. 1, lid 124 may be lowered such that portions of the lid 124 are inserted into lid-receiving gaps of the mounting clips 108. Once the lid 124 is closed and the integrated lock 116 is locked, the screws (not shown) passing through the mounting clips 108 are no longer accessible, the mounting clips 108 are engaged by the lid via the lid-receiving gap, and the lid 124 substantially immobilizes the latching component of the clips 108; thus, the pannier 148 cannot be removed from the rack 101.

A rack according to the invention may be fabricated from aluminum, steel, or any other suitable material. An integrated lock according to the invention may comprise a lock-and-key, such as is shown in FIG. 3A and FIG. 3B, a combination lock, or any other suitable locking mechanism. A lock may be installed on the lid of the luggage rack, such as is shown in FIG. 1, on the rack itself, as shown in, e.g., FIG. 2C, or in any other suitable location. Panniers according to the invention may be installed on either (as shown in FIG. 1) or both sides of the luggage rack, and the rack may be installed on the front (in front of the front fork) or the back (behind the seat) of a bicycle. Mounting clips according to the invention may be fabricated from plastic, nylon, or any other suitably strong, suitably pliable polymer or material. Security rails according to the invention may be fabricated from steel, aluminum, or any other suitable material. As is well-known in the art, stronger materials can provide better security, though they may also increase cost and/or weight.

In a further aspect of the present invention, bags used therewith may themselves be provided with locking closures. This may be accomplished, for example, by use of locking bag provided with locking closures known in the art. Alternatively, the bags may be provided with locking hasps, zipper pulls or buckles with an opening configured to receive and be secured by a strap or cable lock, such as cable lock 128, and to be also secured by security hooks 104 in the same manner as shown for cable lock 128 in FIG. 1.

Though described primarily with reference to bicycles, a locking rack according to the invention may be utilized in numerous other situations where there is a need for being able to securely carry and store items, such as, but not limited to, on a motorcycle or scooter.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A lockable bicycle rack system, comprising:
   at least one rack, comprising:
      a fixed component adapted to be secured to a bicycle frame;
      a lid pivotably attached to said fixed component movable between a first open position and a second closed position, the fixed component and lid defining a fixed locking space therebetween in the closed position;
      a locking mechanism integrated into at least one of said fixed component and said lid for locking the lid in said second closed position; and
   at least one attachment member configured for mounting at least one accessory component to said at least one rack, the attachment member being configured and dimensioned to be captured in said fixed locking space when the lid is locked in said second closed position;
   wherein the at least one accessory component comprises at least one container operatively couplable to said at least one attachment member; and
   wherein said at least one attachment member comprises plural mounting clips mounted to a side of said at least one container.

2. The system according to claim 1, wherein said at least one container comprises at least one bag including at least one component for securing said bag to said plural mounting clips.

3. The system according to claim 2, wherein said at least one component for securing said bag to said plural mounting clips comprises a channel member fixed to a face of the at least one bag that defines a channel configured and dimensioned to slidingly receive a face of said plural mounting clips.

4. The system according to claim 3, wherein said plural mounting clips include fastening means for fastening each said plural mounting clip to said channel member.

5. The rack according to claim 1, wherein the at least one attachment member further comprises:
   a base component adapted to be secured to the at least one accessory component to be mounted on the rack;
   a support member extending outwardly from said base component;
   a downwardly directed gap formed at least partially by an inner end of said support member adjacent the base component, the downwardly directed gap configured and dimensioned to receive the fixed component of the at least one rack and with a portion of said support member positioned between the fixed component and the lid; and
   a moveable lock member with a first end configured to at least partially enclose the fixed component of the at least one rack when received in said downwardly directed gap, said lock member being positioned such that movement of the lock member is blocked by the lid in the second closed position.

6. The rack according to claim 5, wherein said lock member comprises an upstanding actuation portion movable to open the first end to receive the fixed component of the at least one rack.

7. The rack according to claim 5, wherein said base component is configured and dimensioned to be received in a channel mounted on a bicycle accessory and secured to the at least one accessory component.

8. A lockable bicycle rack system, comprising:
   at least one rack, comprising:
      a fixed component adapted to be secured to a bicycle frame;
      a lid pivotably attached to said fixed component movable between a first open position and a second closed position, the fixed component and lid defining a fixed locking space therebetween in the closed position;
      a locking mechanism integrated into at least one of said fixed component and said lid for locking the lid in said second closed position;
   at least one attachment member configured for mounting at least one accessory component to said at least one rack, the attachment member being configured and dimensioned to be captured in said fixed locking space when the lid is locked in said second closed position; and
   at least one security hook disposed on said fixed component, said at least one security hook configured and dimensioned with one end at least substantially abutting the lid in said second closed position.

9. The system according to claim 8, wherein said at least one attachment member comprises an elongate flexible member with at least one looped end configured to be captured on said at least one security hook and a member body configured and dimensioned to be received in said fixed locking space.

10. The system according to claim 9, wherein said elongate flexible member comprises a cable.

11. The system according to claim 8, wherein said at least one attachment member comprises a strap extending across a face of said at least one accessory component.

12. A bicycle rack adapted for use in a locking rack system including containers lockable to the rack, comprising:
   a fixed rack component configured and dimensioned to be mounted on a bicycle frame;
   a hinged lid pivotably mounted on said fixed component;
   a locking mechanism integrated into at least one of said fixed component and said lid for locking the lid to the fixed component; and
   side members associated with said fixed rack and said hinged lid configured and dimensioned so as to be spaced apart by a predetermined distance to capture an attachment member therebetween, the attachment member further comprising:
      a base component adapted to be secured to containers lockable to the rack;
      a support member extending outwardly from said base component,
      a downwardly directed gap formed at least partially by an inner end of said support member adjacent the base component, the downwardly directed gap configured and dimensioned to receive the fixed rack component with a portion of said support member positioned between the fixed rack component and the hinged lid, and
      a moveable lock member with a first end configured to at least partially enclose the fixed rack component when received in said downwardly directed gap, said moveable lock member being positioned such that movement of the moveable lock member is blocked by the hinged lid when the hinged lid is in a closed position.

13. The rack according to claim 12, wherein said attachment member comprises at least one component attached to a bag and said locking mechanism is operable to simultaneously secure said lid to said fixed component and said bag to said rack.

14. The rack according to claim 12, wherein said attachment member comprises at least one security clip and said locking mechanism is operable to simultaneously secure said lid to said fixed rack component and said security clip to said rack.

15. The rack according to claim 14, wherein said security clip is securable to a bag.

16. The rack according to claim 12, wherein the moveable lock member comprises an upstanding actuation portion movable to open the first end to receive the fixed rack component.

17. A bicycle rack adapted for use in a locking rack system including containers lockable to the rack, comprising:
   a fixed rack component configured and dimensioned to be mounted on a bicycle frame;
   a hinged lid pivotably mounted on said fixed component;
   a locking mechanism integrated into at least one of said fixed component and said lid for locking the lid to the fixed component; and
   side members associated with said fixed rack and said hinged lid configured and dimensioned so as to be spaced apart by a predetermined distance to capture at least one attachment member therebetween;
   wherein said attachment member comprises a security cable attached to at least one security hook disposed on said fixed rack component at a position covered by said hinged lid when the hinged lid is locked to the fixed component.

18. The rack according to claim 17, wherein said at least one attachment member further comprises a strap extending across a face of at least one of said containers.

19. The rack according to claim 17, wherein said at least one attachment member comprises at least one component attached to at least one of said containers and said locking mechanism is operable to simultaneously secure said lid to said fixed component and said at least one container to said rack.

20. The rack according to claim 17, wherein the at least one attachment member further comprises:
   a base component adapted to be secured to the at least one container to be mounted on the rack;
   a support member extending outwardly from said base component;
   a downwardly directed gap formed at least partially by an inner end of said support member adjacent the base component, the downwardly directed gap configured and dimensioned to receive the fixed component of the at least one rack and with a portion of said support member positioned between the fixed component and the lid; and
   a moveable lock member with a first end configured to at least partially enclose the fixed component of the at least one rack when received in said downwardly directed gap, said lock member being positioned such that movement of the lock member is blocked by the lid in the second closed position.

* * * * *